Figure 1:
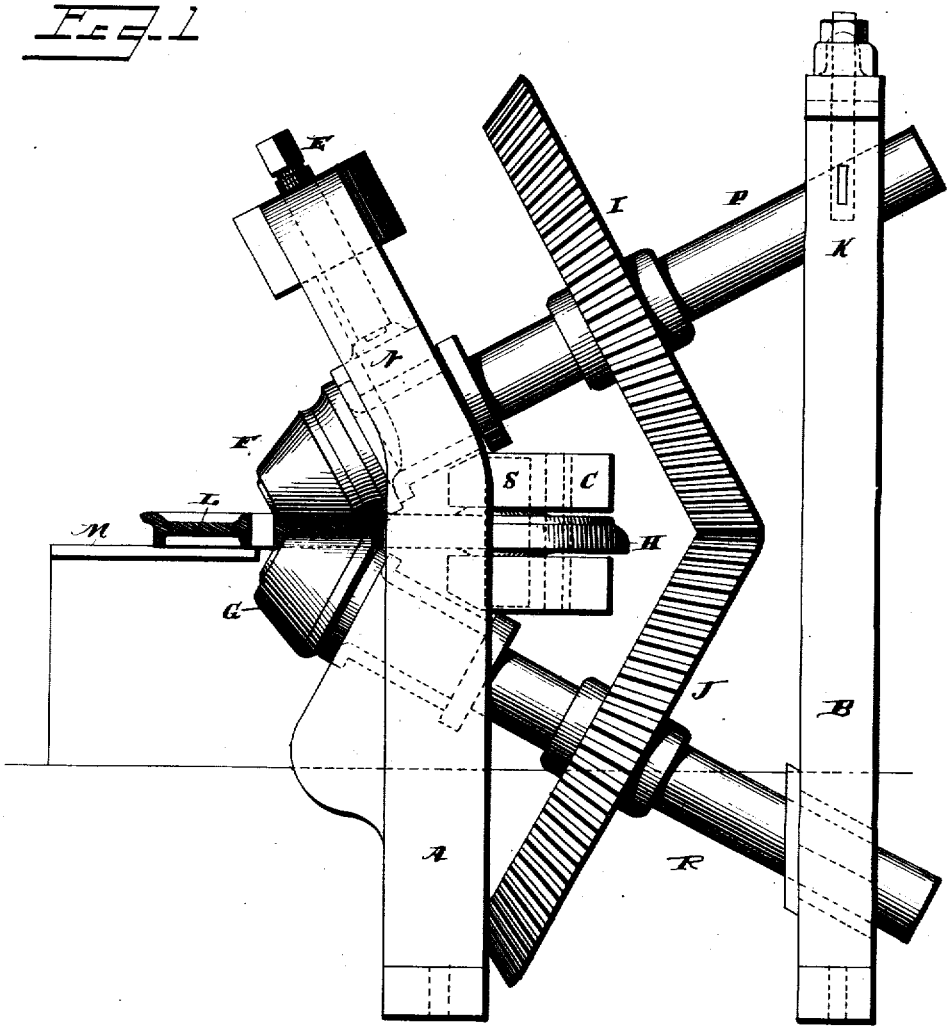

2 Sheets—Sheet 1.

T. W. BEAN.

Assignor to the CONTINENTAL STEEL CAR WHEEL COMPANY.

MACHINE FOR ROLLING CAR WHEELS.

No. 11,048. Reissued Dec. 24, 1889.

Witnesses:
Geo. G. Thorpe
F. B. Kuper

Inventor,
Theodore W. Bean,
by A. G. Dyrenforth,
his Attorney.

2 Sheets—Sheet 2.

T. W. BEAN.

Assignor to the CONTINENTAL STEEL CAR WHEEL COMPANY.

MACHINE FOR ROLLING CAR WHEELS.

No. 11,048. Reissued Dec. 24, 1889.

Witnesses:
Geo. T. Hope.
F. B. Meyer

Inventor:
Theodore W. Bean,
by R. G. Dyrenforth,
his Attorney.

UNITED STATES PATENT OFFICE.

THEODORE W. BEAN, OF NORRISTOWN, PENNSYLVANIA, ASSIGNOR TO THE CONTINENTAL STEEL CAR WHEEL COMPANY, OF SAME PLACE.

MACHINE FOR ROLLING CAR-WHEELS.

SPECIFICATION forming part of Reissued Letters Patent No. 11,048, dated December 24, 1889.

Original No. 361,479, dated April 19, 1887. Application for reissue filed November 14, 1889. Serial No. 330,369.

*To all whom it may concern:*

Be it known that I, THEODORE W. BEAN, a citizen of the United States, residing at Norristown, in the county of Montgomery and State of Pennsylvania, have invented certain new and useful Improvements in Machines for Rolling Car-Wheels; and I do hereby declare the following to be a full, clear, and exact description of the invention, such as will enable others skilled in the art to which it appertains to make and use the same.

This invention relates to car-wheels.

The object of the invention is provide a machine whereby car-wheels of rolled compressed steel may be rapidly and economically produced.

With this object in view the invention consists in a mill for rolling steel car-wheels, comprising one or more pairs of rolls, one member of each pair being mounted in sliding and rocking bearings, the shaft of each roll being provided with a gear-wheel meshing with that on its felly.

Furthermore, the invention consists in a mill for rolling car-wheels, comprising two or more roll-heads of suitable shape to form the sides of a car-wheel, shafts upon which the roll-heads are mounted, each of said shafts being provided with a gear meshing with a corresponding one on its felly, and one of said shafts mounted in sliding and rocking bearings.

Furthermore, the invention consists in a mill for rolling steel car-wheels, comprising a table upon which the ingot to be rolled is placed, one or more pairs of roll-heads, whose shafts are provided with intermeshing gears, and one of which rolls is mounted in sliding and rocking bearings.

Furthermore, the invention consists in a mill for rolling steel car-wheels, comprising one or more pairs of roll-heads of suitable shape to form the sides of a car-wheel, and mounted upon suitable shafts geared with each other, the shaft of one member of each pair being mounted in sliding and rocking bearings, and a horizontal roll for shaping the tread of the wheel and journaled in stationary bearings.

Furthermore, the invention consists in a mill for rolling steel car-wheels, consisting in a table upon which the ingot to be rolled is placed, one or more pairs of roll-heads of a form to give the desired shape to the side of the wheels, the said roll-heads being mounted on shafts which are geared together, one member of each pair of shafts being mounted in sliding and rocking bearings, and a horizontal roll mounted adjacent to the table and of a shape to give the desired form to the tread of the wheel.

I have illustrated the invention in the accompanying drawings, in which—

Figure 2:
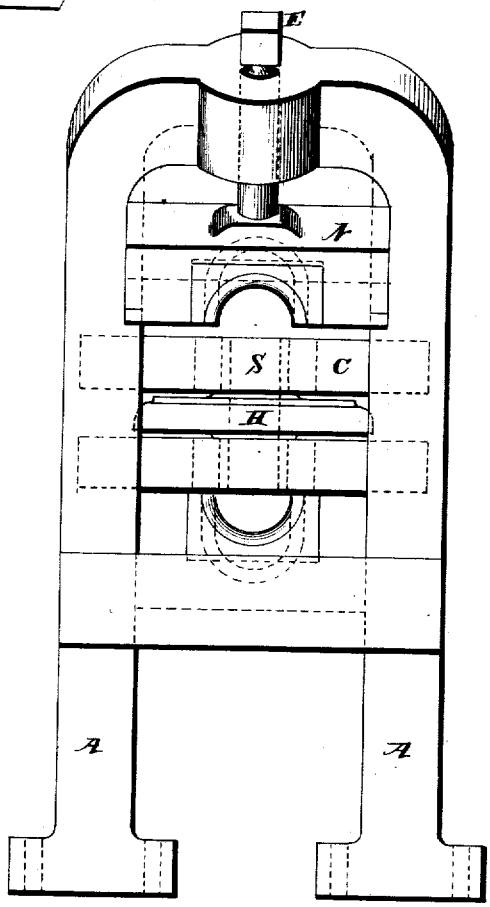
Figure 3:
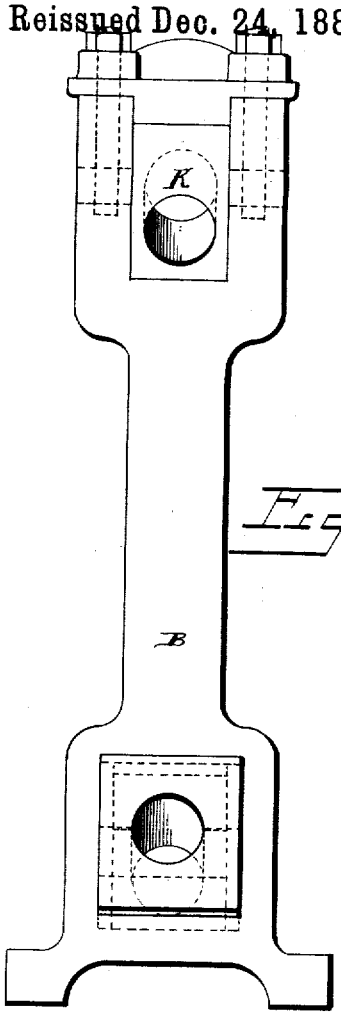
Figure 4:
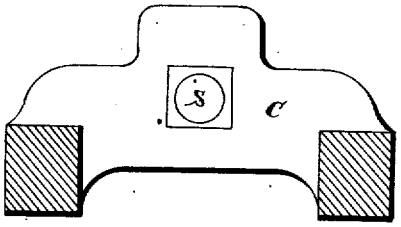

Figure 1 is a side view of a portion of a mill constructed in accordance with my invention. Fig. 2 represents a front elevation of the housings of the mill with the rolls removed. Fig. 3 is a detail view of the housing, and Fig. 4 is a detail view showing the bearings for the horizontal roll.

In the drawings, A and B represent housings, in which shafts P and R, carrying roll-heads F and G, are journaled. These roll-heads are so shaped as to give the desired form to the steel ingot which is to be pressed by them into the exact size required. The shaft P is mounted at its extreme outer end in the ball-box K in the upper bearing B. The construction of these parts is such as to allow the roll-head on the shaft P to be raised or lowered, the bearing acting as a stationary pivot. The desired pressure on the roll-head F is given by the screw E on the rider N. This screw provides means for separating the roll-heads sufficiently to allow the steel ingot to be placed between them on the table M. The shafts P and R, carrying the roll-heads, are provided with bevel gear-wheels I and J, which intermesh.

H represents a horizontal roll, the periphery of which gives the desired shape to the tread of the wheel, the roll being arranged in proper position relative to the roll-heads to accomplish this.

S and C represent projections on the housing A, in which the horizontal roll H is journaled.

In the operation of the machine power is supplied to the shaft R. The ingot of steel, having been cast to a suitable shape and sufficiently heated, is placed in position on the table M between the roll-heads. The screw E is turned to force the rider N against the roll F, and the steel ingot is thus pressed between it and the lower roll. The rolls H and G act as a die, while the upper roll gradually descends and compresses the metal, rendering it homogeneous throughout and of the greatest tensile strength.

I do not limit myself to two rolls for shaping the sides of the gear-wheel, as it is evident that any desired number may be geared directly together and that any number of pairs of rolls may be utilized.

I am aware that mills for rolling iron car-wheels have been patented before this invention was made; but their construction differs materially in important details, and especially in the gearing of the two shafts.

Having thus fully described my invention, what I claim as new, and desire to secure by Letters Patent, is—

1. A mill for rolling car-wheels, comprising one or more pairs of rolls, one member of each pair being mounted in sliding and rocking bearings, the shaft of each roll being provided with a gear-wheel meshing with a corresponding one on its felly.

2. A mill for rolling car-wheels, comprising two or more roll-heads of suitable shape to form the sides of a car-wheel, shafts upon which the roll-heads are mounted, each of the shafts being provided with a gear meshing with a corresponding one on its felly, and one of said shafts being mounted in sliding rocking bearings, substantially as described.

3. A mill for rolling steel car wheels, comprising a table upon which the ingot to be rolled is placed, one or more pairs of roll-heads, whose shafts are provided with intermeshing gears, one of the shafts being mounted in sliding and rocking bearings, substantially as described.

4. A mill for rolling steel car-wheels, comprising one or more pairs of roll-heads of suitable shape to form the side of a car-wheel and mounted upon suitable shafts geared with each other, the shaft of one member of each pair being mounted in sliding rocking bearings, and a horizontal roll for shaping the tread of the wheel and journaled in stationary bearings, substantially as described.

5. A mill for rolling steel car-wheels, consisting in a table upon which the ingot to be rolled is placed, one or more roll-heads of a form to give the desired shape to the sides of the wheels, the roll-heads being mounted in shafts which gear together, one member of each pair of shafts being mounted in sliding and rocking bearings, and a horizontal roll mounted adjacent to the table and of a shape to give the desired shape to the tread of the wheel, substantially as described.

In testimony whereof I affix my signature in presence of two witnesses.

THEODORE W. BEAN.

Witnesses:
MONTY. EVANS,
LOUIS M. CHILDS.

Corrections in Reissue Letters Patent No. 11,048.

It is hereby certified that in Reissue Letters Patent No. 11,048, granted December 24, 1889, upon the application of Theodore W. Bean, of Norristown, Pennsylvania, for an improvement in "Machines for Rolling Car-Wheels," errors appear in the printed specification requiring the following corrections, viz: In lines 23 and 30, page 1, and lines 28 and 34, page 2, the word "felly" should read *fellow;* and that the said Letters Patent should be read with these corrections therein that the same may conform to the record of the case in the Patent Office.

Signed, countersigned and sealed this 28th day of January, A. D. 1890.

[SEAL.]

CYRUS BUSSEY,
*Assistant Secretary of the Interior.*

Countersigned:

C. E. MITCHELL,
*Commissioner of Patents.*